May 27, 1952      J. K. ROSE      2,598,072

REFLECTIVE MASK FOR TELEVISION CABINET FRONT

Filed Nov. 4, 1948      2 SHEETS—SHEET 1

Inventor,
Joseph K. Rose,
Benjamin Schlosser
Atty.

May 27, 1952 J. K. ROSE 2,598,072
REFLECTIVE MASK FOR TELEVISION CABINET FRONT
Filed Nov. 4, 1948 2 SHEETS—SHEET 2

Inventor
Joseph K. Rose,
Benjamin Schlosser
Atty

Patented May 27, 1952

2,598,072

UNITED STATES PATENT OFFICE 2,598,072

REFLECTIVE MASK FOR TELEVISION CABINET FRONTS

Joseph K. Rose, Chicago, Ill.

Application November 4, 1948, Serial No. 58,343

7 Claims. (Cl. 178—7.5)

This invention relates to a reflective mask for a television cabinet front, and is particularly concerned with means for reducing eye strain in connection with prolonged viewing of a viewing apparatus such as a television receiver, oscilloscope, or slide viewer in which the image exhibiting member is surrounded by a relatively dark area.

Looking at the image exhibiting member in a television receiver or other viewing apparatus for any prolonged period of time very often results in eye strain. One major cause of this eye strain is the difference in brightness between the object on the image exhibiting member and the area surrounding the image exhibiting member which is within the range of vision of the viewer. The eye tends to accommodate itself to only one level of brightness at a time. Severe eye strain is caused by large and abrupt changes of brightness within the range of vision.

Cabinets of television receivers and other viewing apparatus are very often constructed of dark wood, such as mahogany or walnut, and the wall surface in back of the cabinet is generally lighter in color than the cabinet and darker than the image exhibiting member. Persons looking at the image exhibiting member can not limit their range of vision to only the image exhibiting member, and are constantly seeing the dark area of the cabinet surrounding the image exhibiting member and the third area of still different brightness surrounding the cabinet. It is the intermediate area of relative darkness between the bright area of the image exhibiting member and the less bright area of the wall surface that causes most of the eye strain.

In accordance with my present invention, the eye strain ordinarily incidental to prolonged viewing of an image exhibiting member in a television receiver or other viewing apparatus is considerably reduced by intensifying the brightness of the area immediately surrounding the image exhibiting member to reduce the contrast in brightness between the two. This increase in brightness of the area immediately surrounding the image exhibiting member also generally reduces the brightness contrast between it and the background wall surface.

The effect of increasing the brightness of the area immediately adjacent to and surrounding the image exhibiting member, so as to more nearly equalize the brightness of the two, is of great benefit to the eyes of the viewer, even if the area beyond the adjacent surrounding area, and within the range of vision, is dark. The reason for this is that for ease of viewing, from the standpoint of eye strain, a lower brightness ratio is required between the image exhibiting member and the adjacent surrounding area than between the image exhibiting member and the more remote area within the range of vision.

The brightness of the area immediately adjacent to and surrounding the image exhibiting member may be intensified in three different ways, represented by different structural embodiments of the invention, each of which will be hereinafter described in detail. The first method of intensifying the brightness of the area surrounding the image exhibiting member is by positioning a mask, having a higher diffuse reflection factor than the front surface of the cabinet, in front of the cabinet so as to frame the image exhibiting member. The exposed surface of this mask is generally white or light cream in color and may have a diffuse reflection factor of 80%. The dark wood finish of the cabinet which the mask covers may have a diffuse reflection factor of 15%. In a level of illumination of twenty foot-candles, the mask would have a brightness of sixteen foot-lamberts while the dark wood finish would have a brightness of three foot-lamberts. Viewing an image exhibiting member with an average brightness of eighteen foot-lamberts would be quite comfortable with the mask in place, but without it the eyes would tire rapidly, due to the brightness contrast between the adjacent areas having a brightness of eighteen foot-lamberts and three foot-lamberts, respectively.

The second method of intensifying the brightness of the area surrounding the image exhibiting member is applicable to cabinets having a movable member, such as a door or pair of doors. The door in closed position covers the panel surrounding the image exhibiting member and generally covers the image exhibiting member as well. The outside surface of the door is dark to match the finish of the cabinet. The panel surrounding the image exhibiting member and the inside surface of the door are finished in a white or light cream color so that when the door is in open position, the area around the image exhibiting member is much brighter than the dark finish of the cabinet.

The third method of intensifying the brightness of the area surrounding the image exhibiting member is by lighting this area with emitted light. In this method a translucent panel is used to frame the image exhibiting member and lights concealed within the cabinet are used to light the panel.

The principal object of my invention is to reduce the eye strain incidental to prolonged viewing of an image exhibiting member in a television receiver, oscilloscope, slide viewer, or similar apparatus by increasing the brightness of the area surrounding the image exhibiting member so as to make the brightness of this area more nearly equal to the brightness of the image exhibiting member.

It is another object of my invention to reduce the eye strain by efficient, inexpensive means that may be integral with the cabinet of the viewing apparatus, or may be added thereto as an auxiliary element, and may be concealed within the cabinet or removed therefrom when the viewing apparatus is not being used, so that the outward appearance of the cabinet is not changed.

Other objects of my invention will become apparent upon reading the following description, taken in conjunction with the accompanying drawings, in which.

Figure 1:
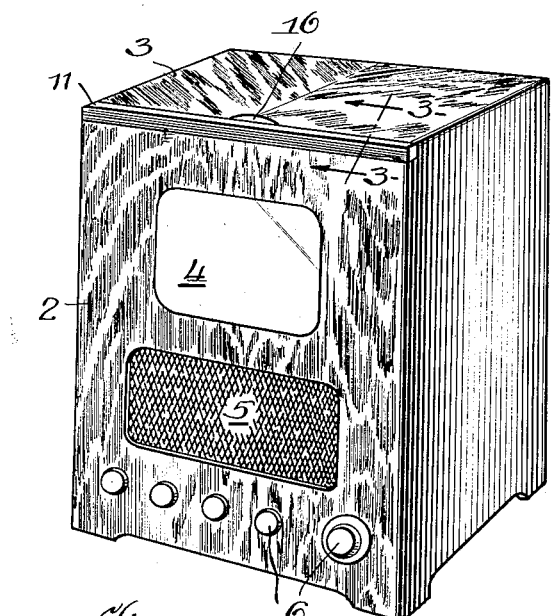
Figure 1 is a perspective view of a television receiver cabinet embodying the invention.
Figure 3:
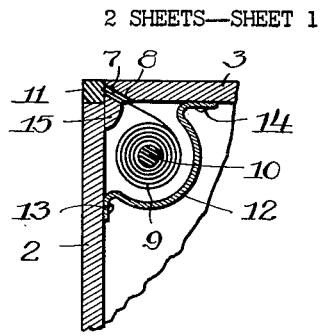
Figure 3 is a fragmentary cross sectional view, taken along the line 3—3 of Figure 1.
Figure 2:
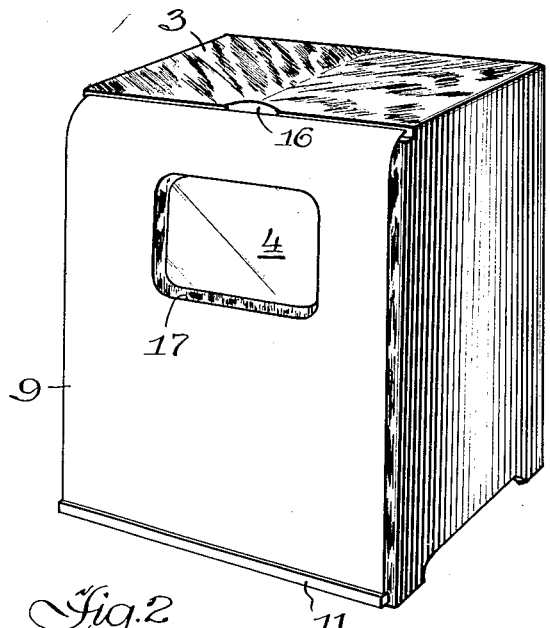
Figure 2 is a view, similar to Figure 1, showing the mask in extended position covering the front of the television receiver cabinet except for the image exhibiting member.

In the drawings, referring to Figures 1, 2 and 3, the television receiver cabinet includes a front wall 2 and a top wall 3. An image exhibiting member 4 is exposed through a suitably shaped opening in the front wall. The front wall also has a grill 5 positioned in front of a speaker, and a plurality of control knobs 6. A slot 7 extends across the cabinet at the juncture of the front and top walls. The underside of the top wall is beveled, as indicated at 8.

A rolled sheet 9 of any suitable material is wound around a rod 10 in a manner similar to a conventional window shade, and the ends of the rod are rotatably mounted on the side walls of the cabinet. The free end of roll 9 extends through slot 7 and is secured to a metal bar 11 finished to match the finish of the cabinet. The top front edge of the cabinet is recessed to form a seat for the bar 11 when the roll 9 is retracted so that the bar will appear to be part of the cabinet when in this position. The bar is larger in diameter than the width of slot 7 so that it can not pass through the slot.

A metal bracket 12, shaped to provide clearance for the roll 9 is secured to the inner surface of front wall 2 and top wall 3, as indicated at 13 and 14. The bracket 12 serves as a reinforcement for the cabinet adjacent the slot 7. A strip 15 glued or otherwise secured to the inside of front wall 2 forms the bottom of slot 7 and brings the line of exit of the rolled sheet 9 close to the upper surface of cabinet top 3. The front edge of top wall 3 may be notched, as indicated at 16, to provide a finger grip for bar 11 so that the bar may be grasped easily when the rolled sheet 9 is to be pulled out of the cabinet.

When the rolled sheet 9 is pulled out to its fully extended position the bar 11 is positioned in front of the bottom edge of the front wall 2, and the sheet 9 masks the entire front surface of the cabinet except for the image exhibiting member 4 which is visible through an opening 17 provided in mask 9 for this purpose. The weight of bar 11 is sufficient to hold the mask 9 in place. It is essential that the exposed surface of sheet 9 be brighter than the finish of the cabinet. In addition to aperture 17, sheet 9 may be provided with apertures which will register with the grill 5 and control knobs 6 when it is in masking position, but this is generally not necessary because the sheet does not interfere appreciably with sound reception and the bottom end may be readily moved outwardly if access to the control knobs 6 is desired. To return the mask 9 to its rolled up position, as shown in Figure 3, the bar 11 is pulled outwardly to clear the front of the cabinet, and then pulled downwardly a slight amount to actuate a spring in rod 10 which retracts the sheet in the same manner as a conventional window shade.

Instead of forming the mask 9 of flexible material it could be made of linked slats, similar to the flexible top of a roll top desk, or could even be made of a solid panel that could be pulled through a slot in the front of the cabinet and hinged to fold over the front surface of the cabinet. Any of these masks could be concealed in the bottom of the cabinet as well as in the top.

Figure 4:
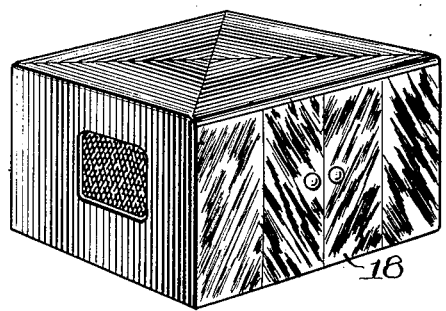
Figure 4 is a perspective view of a television receiver cabinet embodying another form of the invention.
Figure 5:
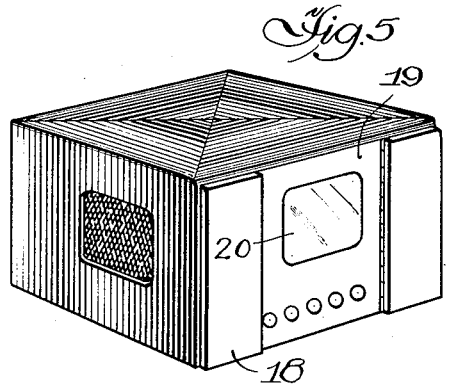
Figure 5 is a perspective view of the cabinet shown in Figure 4, with the doors open to expose the brighter front area surrounding the image exhibiting member.

In Figures 4 and 5, the cabinet is provided with a pair of doors 18 hinged to conceal or to expose a center panel 19 framing an image exhibiting member 20. The panel 19 and the inside surface of doors 18 are finished in white or a light cream color so that when the doors are open to expose the screen the area surrounding the screen is much brighter than the finish of the cabinet. The outer surface of the doors matches the appearance of the cabinet so that when the doors are closed the beauty of the cabinet is not spoiled by the contrast between the light front panel and the dark finish of the rest of the cabinet.

Figure 6:
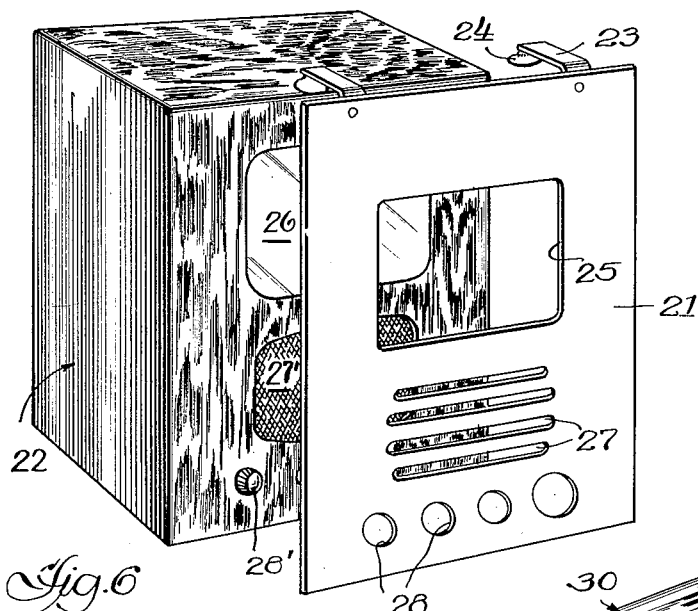
Figure 6 is a perspective view of another embodiment of the invention showing a rigid mask in disassembled position in front of a television cabinet.
Figure 7:
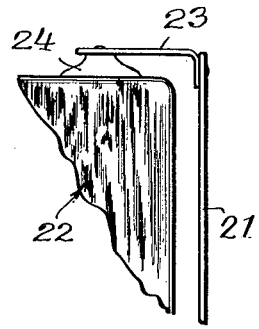
Figure 7 is a fragmentary side elevation showing the mask of Figure 6 secured to the top of the cabinet.

In the embodiment of the invention illustrated in Figures 6 and 7, a rigid mask 21 is secured to the top of a cabinet 22 by means of brackets 23 provided with suction cups 24. The mask may be made of wood, metal, cardboard, or any other suitable material. The exact manner of securing the mask 21 to the cabinet is not important and any suitable means may be used. For example, the top of the cabinet may be provided with glove fasteners and the brackets may have cooperating parts. It is also possible for brackets 23 to be replaced by flexible straps. The mask 21 is provided with an aperture 25 adapted to register with the image exhibiting member 26 in the front of the cabinet. If desired, apertures 27 may be provided in the mask to register with the grill 27', and apertures 28 to register with the control knobs 28'.

Figure 8:
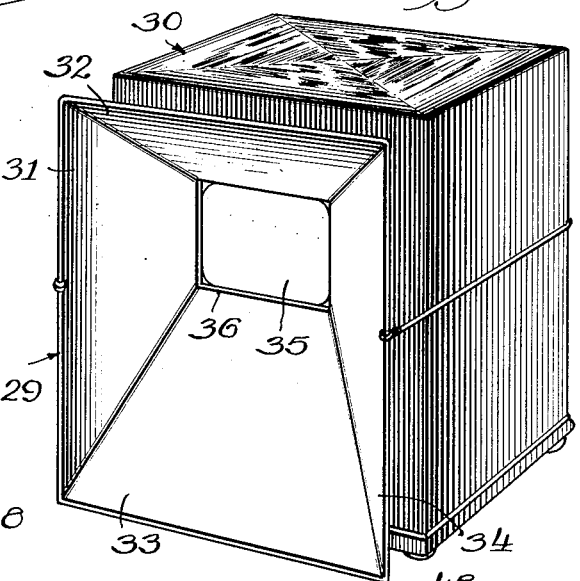
Figure 8 is a perspective view of a television cabinet with another form of mask secured in front of the cabinet so as to frame the image exhibiting member.
Figure 9:
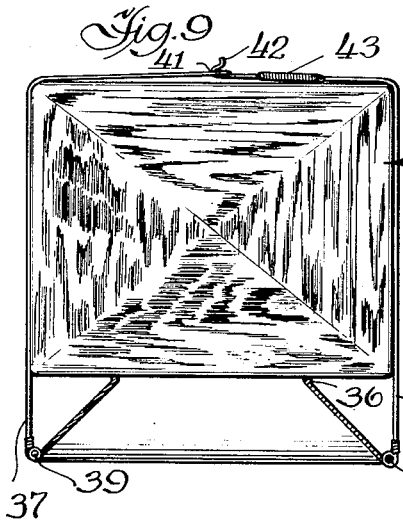
Figure 9 is a top elevation of the cabinet and mask illustrated in Figure 8.

The embodiment of the invention illustrated in Figures 8 and 9 is similar to the embodiment shown in Figures 6 and 7 in that a rigid mask 29 is secured in front of a television receiver cabinet 30. The mask 29 may be made of any suitable material, such as plastic, cardboard, wood, or metal, and is in the form of a truncated pyramid comprising side walls 31, 32, 33 and 34 diverging outwardly from the cabinet. Both bases of the pyramid are open, and the smaller base is in registration with the image exhibiting member 35. The joint between the edges of the smaller base and the cabinet adjacent the image exhibiting member may be sealed by a strip 36 of rubber or similar material to prevent any external light from passing through the joint to strike the image exhibiting member.

The pyramidal shape of the mask 29 causes it to act as a light shield, similar to the light shield disclosed in my co-pending application, Serial No. 727,792, filed February 11, 1947, to protect the image exhibiting member from external light. As in the other embodiments, the exposed surface of the mask 29 is finished in white or a light cream color to eliminate the dark area which would otherwise surround the image exhibiting member.

The mask 29 may be secured to the cabinet in any suitable manner. The means illustrated in Figures 8 and 9 comprises a pair of wires 37 and 38 each of which is secured at one end to opposite edges of side walls 31 and 34, as indicated at 39 and 40, respectively. The opposite ends of the wires are provided with complementary fastening means, such as an aperture 41 and a hook 42 by means of which they are secured together. One of the wires may be provided with a coiled spring 43 to tension the tie members. The wires are preferably insulated to prevent scratching or marring the finish of the cabinet.

Figure 10:
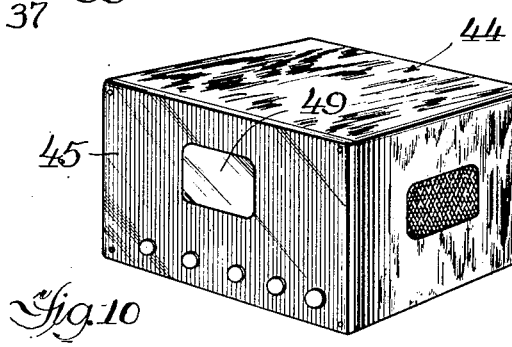
Figure 10 is a perspective view of a television receiver cabinet embodying another form of the invention.
Figure 11:
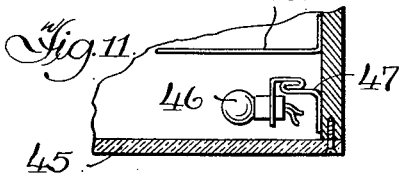
Figure 11 is a fragmentary cross sectional view of the cabinet illustrated in Figure 10.

In the embodiment of the invention illustrated in Figures 10 and 11 the cabinet 44 is provided with a translucent front wall 45 made of glass or suitable plastic material and colored to harmonize with the finish of the rest of the cabinet. A plurality of electric lights 46 are mounted in brackets 47 secured to the walls of the cabinet adjacent the front edge thereof. The lights may be connected to the transformer in the television receiver and may be provided with a separate switch so that they may be turned on or off independently of the television receiver, or they may be wired so that they will be turned on automatically when the television receiver is turned on, and turned off when the television receiver is turned off. Preferably a reflecting panel 48 is secured to the walls of the cabinet in back of the lights to enhance the lighting effect.

When the lights 46 are lighted the front wall 45 is illuminated so that it is almost as bright as the image exhibiting member 49 and the dark area which would otherwise surround the image exhibiting member is entirely eliminated.

Although I have described a few preferred embodiments of my invention in considerable detail, it will be understood that the description thereof is intended to be illustrative, rather than restrictive, as many details may be modified or changed without departing from the spirit or scope of my invention. Accordingly, I do not desire to be restricted to the exact structure disclosed, except as limited by the appended claims.

I claim:

1. In combination with a cabinet of the television receiver type having an image exhibiting member occupying a portion of the front of the cabinet and a panel surrounding said image exhibiting member, said panel constituting a portion of the front of said cabinet, an auxiliary member removably positioned adjacent said image exhibiting member, said auxiliary member having a higher diffuse reflection factor than said panel, whereby it is effective to increase the brightness of the area immediately adjacent said image exhibiting member.

2. In a viewing apparatus, a cabinet, an image exhibiting member, a mask movable relative to said cabinet from a position substantially within said cabinet to an exposed position in which it covers the surface of said cabinet adjacent said image exhibiting member, the exposed surface of said mask having a diffuse reflection factor higher than the diffuse reflection factor of the surface of said cabinet which it covers.

3. In a television receiver cabinet having an image exhibiting member occupying a portion of its front, a mask movable between a substantially concealed position and a position in which it covers substantially the entire front surface of said cabinet except said image exhibiting member, the exposed surface of said mask having a higher diffuse reflection factor than the surface of said cabinet which it covers.

4. In a television receiver, a cabinet, an image exhibiting member in said cabinet, and a mask removably secured to said cabinet, said mask covering the surface of said cabinet adjacent said image exhibiting member and having an opening through which said image exhibiting member may be viewed, the surface of said mask having a higher diffuse reflection factor than the surface of said cabinet which it covers.

5. In a viewing apparatus, a cabinet, an image exhibiting member, and a movable member operable to expose or conceal the surface of said cabinet adjacent said image exhibiting member, the diffuse reflection factor of the surface of said cabinet adjacent said image exhibiting member being lower than the diffuse reflection factor of the surface of said movable member exposed when said movable member is in concealing position.

6. In a television cabinet having an apertured wall and an image exhibiting member visible through said apertured wall, a masking sheet wound around a roller secured to said cabinet adjacent said apertured wall, said masking sheet having an area substantially equal to the area of said apertured wall and an aperture registering with said image exhibiting member when said masking sheet is unwound, the exposed surface of said sheet having a higher diffuse reflection factor than the finish of said cabinet.

7. In a television cabinet having an apertured front wall and an image exhibiting member visible through said apertured wall, a roller mounted in said cabinet adjacent said wall, a slot in said cabinet adjacent said roller, a masking sheet wound on said roller and having its free end extending through said slot, and an end member larger than said slot secured to said free end of said masking sheet, said masking sheet having an area substantially equal to the area of said apertured wall and an aperture registering with said image exhibiting member when said sheet is unwound, the exposed surface of said sheet having a diffuse reflection factor higher than the surface of the cabinet which it covers.

JOSEPH K. ROSE.

REFERENCES CITED

The following references are of record in the file of this patent:

UNITED STATES PATENTS

| Number | Name | Date |
|---|---|---|
| 1,437,442 | Pinanski | Dec. 5, 1922 |
| 1,988,522 | Stanley | Jan. 22, 1935 |
| 2,117,857 | Schlanger et al. | May 17, 1938 |
| 2,147,305 | Marten | Feb. 14, 1939 |
| 2,285,509 | Goshaw | June 9, 1942 |
| 2,298,870 | Cooper | Oct. 13, 1942 |

FOREIGN PATENTS

| Number | Country | Date |
|---|---|---|
| 111,286 | Australia | Aug. 29, 1940 |
| 248,982 | Switzerland | Mar. 16, 1948 |
| 460,508 | Great Britain | Jan. 28, 1937 |
| 534,973 | Great Britain | Mar. 25, 1941 |
| 866,438 | France | Aug. 12, 1941 |